United States Patent [19]

Heath et al.

[11] 4,362,052
[45] Dec. 7, 1982

[54] FLOWMETER

[75] Inventors: Alastair E. F. Heath, Dunton; David J. Neville, Aylesbury; Barry Cockburn, Gawcott; Stephen Bussey, Buckingham, all of England

[73] Assignee: Leslie Hartridge Limited, Buckingham, England

[21] Appl. No.: 259,354

[22] Filed: Apr. 30, 1981

[30] Foreign Application Priority Data

May 16, 1980 [GB] United Kingdom ................ 8016368

[51] Int. Cl.³ .............................................. G01F 3/14
[52] U.S. Cl. ..................................... 73/119 A; 73/239
[58] Field of Search ..................... 73/119 A, 113, 239, 73/243, 3

[56] References Cited

U.S. PATENT DOCUMENTS

4,070,907  1/1978  Emerson ........................... 73/119 A
4,307,601  12/1981  Jackson ..................................... 73/3
4,328,697  5/1982  Tumber et al. ........................... 73/3

Primary Examiner—Jerry W. Myracle
Attorney, Agent, or Firm—Berman, Aisenberg & Platt

[57] ABSTRACT

A flowmeter comprising a piston and cylinder arrangement and measuring means arranged to measure the distance through which the piston moves as fluid flows into the arrangement, in which measurement commences with a flying start with fluid already flowing into the piston and cylinder arrangement and the piston is returned to a starting end of its travel before each succeeding measurement.

10 Claims, 12 Drawing Figures

FLOWMETER

The present invention relates to a flowmeter.

In U.S. Pat. No. 4,070,907, is described a fluid delivery meter for measuring and indicating the quantity of fluid delivered by engine fuel injection means "on test". The meter has a chamber for receiving the fluid and a spring-loaded piston or plunger within the chamber which is displaced against the load of the spring as fuel enters the chamber on one side of the piston. The movement of the piston or plunger is monitored by an indicator, which provides a display of the total movement for a given number of injection pump driving shaft turns or over a predetermined period of time. Since the piston or plunger movement is directly proportional to the amount of fluid entering the chamber, the indicator shows the fluid flow rate.

Prior to use, the flowmeter is preset by adjusting the link between the piston or plunger and the indicator so that the latter gives a zero reading when the piston or plunger is at an upper extreme of its available travel in the chamber. When it is desired to take a measurement, the shuttle of a solenoid operated valve is lifted to allow fluid from the injector to be fed into the flowmeter chamber instead of into a tank or reservoir. This introduces errors into the reading, termed "end effects", owing to the start from a static position of the metering piston, movement of fluid caused by the opening of the solenoid valve to initiate metering, the finite time of travel of the shuttle in the valve during its opening, and a "pump-up" effect on the system which takes place over the first, say, ten injections, so that there is some delay before the fluid flow reaches a condition where displacement of the piston or plunger is exactly proportional to injected fuel volume for each consecutive injection.

An aim of the present invention is to eliminate or at least to reduce those errors termed "end effects".

Accordingly, the present invention is concerned with flowmeters in which flow of fluid from a fuel injector into a displacement chamber is given an opportunity of reaching the aforesaid condition before measurement commences. The invention is thus also concerned with a method of measuring flowrate in this way. Measurement with such a flying start eliminates or at least reduces errors caused by end effects. Accuracy is improved even more if the measurement ends with a flying finish.

In one of its forms, the present invention provides a flowmeter comprising a cylinder or other chamber-defining part and a piston or other displaceable member which is moveable in relation to the chamber-defining part between two ends of travel to change the size of the chamber, flow-control means arranged to control the flow of fluid selectively through an inlet path to the chamber to move the displaceable member, or from the inlet path to an outlet path of the flowmeter without moving the displaceable member, measuring means arranged to measure the distance through which the displaceable member moves, flying start means connected to the measuring means to cause the latter to commence measurement at a time after the flow control means have been switched to cause fluid to move the displaceable member away from one of its ends of travel, terminating means arranged to cause the measurement to be terminated before the displaceable member reaches its other end of travel so that the measurement is completed during a single stroke of the displaceable member, and return means arranged to return the displaceable member to its starting end of travel before each succeeding measurement by the measuring means, whereby all measurements are made with the displaceable member travelling in the same direction.

In another of its forms, the invention is directed to a flowmeter comprising a cylinder or other chamber-defining part and a piston or other displaceable member which is moveable in relation to the chamber-defining part between two ends of travel to change the size of the chamber, flow-control means arranged to control the flow of fluid selectively through an inlet path to the chamber to move the displaceable member, or from the inlet path to an outlet path of the flowmeter without moving the displaceable member, measuring means arranged to measure the distance through which the displaceable member moves, flying start means connected to the measuring means to cause the latter to commence measurement at a time after the flow-control means have been switched to cause fluid to move the displaceable member away from one of its ends of travel, and a pressurizing valve arranged in the inlet path to the chamber and constructed to ensure that there is a pressure differential across it to force any gas which forms in the fluid upstream of the valve when the flowmeter is in use, back into solution. Gas might be brought out of solution, for example, by an injection process during which there is a very high pressure drop.

The flow-control means may be downstream of the pressurizing valve, and the outlet path of the flowmeter may include a further chamber underneath the piston or other displaceable member. It is also desirable to provide a second pressurized valve downstream of the said further chamber to inhibit gas coming out of solution between the first pressurizing valve and an outlet from the said further chamber.

Another form of the invention resides in a flowmeter comprising a cylinder or other chamber-defining part and a piston or other displaceable member which is moveable in relation to the chamber-defining part between two ends of travel to change the size of the chamber, flow control means arranged to control the flow of fluid selectively through an inlet path to the chamber to move the displaceable member, or from the inlet path to an outlet path of the flowmeter without moving the displaceable member, measuring means arranged to measure the distance through which the displaceable member moves, flying start means connected to the measuring means to cause the latter to commence measurement at a time after the flow-control means have been switched to cause fluid to move the displaceable member away from one of its ends of travel, and temperature control means arranged upstream of the chamber to maintain the temperature of the fluid within a predetermined range. For example, the temperature control means may comprise an intercooler in which fluid at a substantially predetermined temperature is passed adjacent to fluid which is being metered to allow heat exchange between the fluids.

According to a further aspect of the present invention, there is provided a flowmeter comprising a cylinder or other chamber-defining part and a piston or other displaceable member which is movable in relation to the chamber-defining part between two ends of travel to change the size of the chamber, flow-control means arranged to control the flow of fluid selectively through an inlet path to the chamber to move the displaceable member, or from the inlet path to an outlet path of the flowmeter without moving the displaceable member, measuring means arranged to measure the distance through which the displaceable member moves, flying start means connected to the measuring means to cause the latter to commence measurement at a time after the flow-control means have been switched to cause fluid to move the displaceable member away from one of its ends of travel, and flow-biasing means arranged to allow fluid to flow from the inlet path to the outlet path of the flowmeter without moving the displaceable member more easily than through the inlet path to move the displaceable member, the flow-control means comprising a single open-and-shut valve arranged in the outlet path.

The invention may be realized in a precision positive displacement flowmeter for measuring the quantity of fluid delivered by engine fuel injection means "on test", comprising detector means for detecting when a rotating driving shaft or other moving part of the injection means passes through a predetermined position, flow-directing means for directing fluid into a passageway between the injection means and the flowmeter to commence displacement of a piston or other member of the flowmeter in a given direction by fluid from the injection means, and measuring means connected to the flow-directing means, the detector means and the member of the flowmeter which is displaced when the flowmeter is in use, and constructed to start measuring the displacement of the said member in the given direction at the precise instant when the said moving part passes through the said predetermined position and after that part has passed through that position a preset number of times following direction of fluid into the passageway.

Preferably, the measurement is also precisely terminated at the instant when the said moving part passes through the said predetermined position for the $n^{th}$ time after commencement of the measurement, n being a preselected whole number. The flowmeter is particularly accurate with the displacement member of the flowmeter continuing in the same direction of movement throughout the measurement.

This flowmeter can be designed to collect and measure the volume of injected fuel or other fluid at a standard temperature of 40° C. with a fundamental accuracy of better than 0.25% of reading. It may be adapted for a wide range of applications, for example from a Unit Injector having an output of only 5 Cu.mm/stroke to an eight line Distributor or In-Line pumps having outputs of up to 200 Cu.mm/stroke on each line. It can be used to measure the delivery on individual lines as well as the total delivery for one pump driving shaft turn.

Measurement is preferably performed by collecting injected fuel or other fluid over a pre-selected number of injections or pump shaft turns, computing the average value of injector output per injection or shaft turn, and displaying the result digitally in Cu.mm/stroke per line.

One example of a flowmeter in accordance with the present invention is illustrated in the accompanying drawings, in which.

Figures 1, 1A:
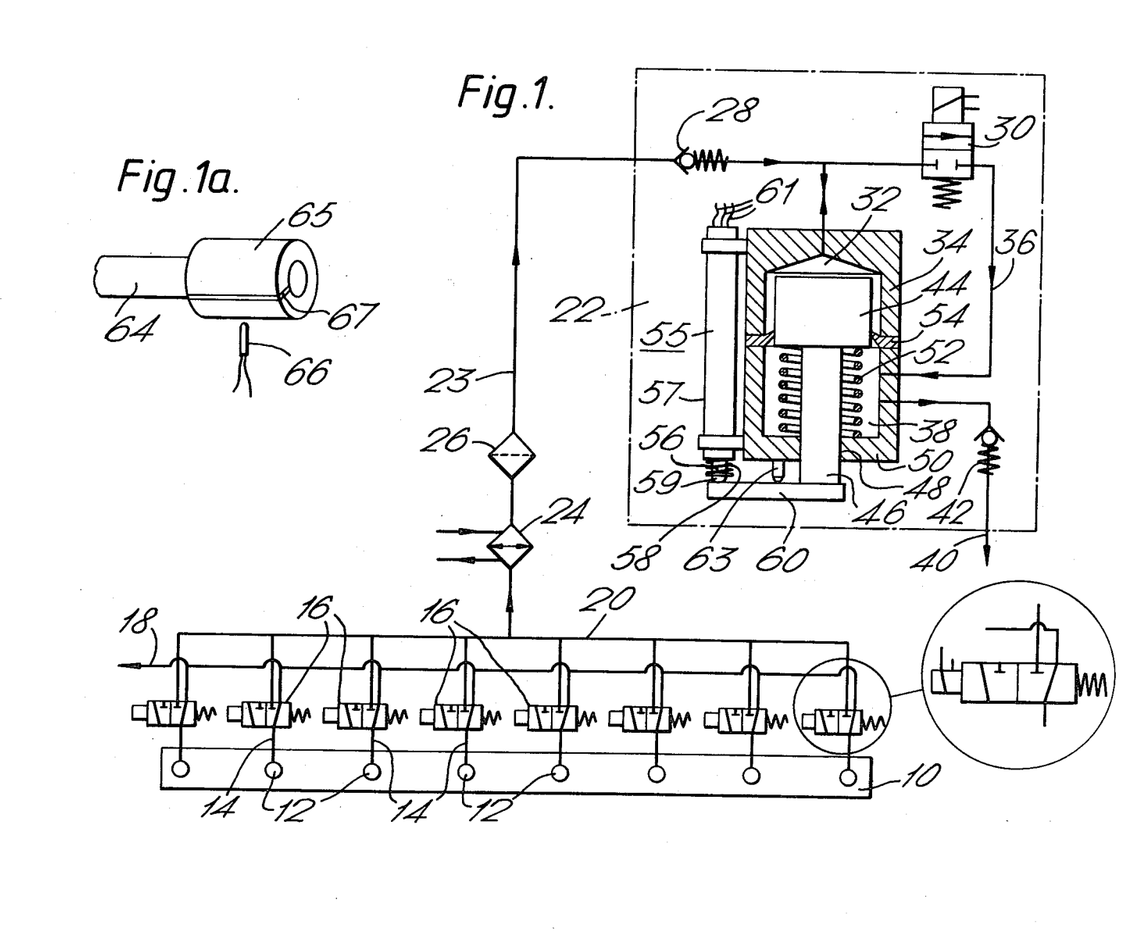
FIG. 1 is a fluid circuit diagram of the flowmeter when incorporated in an eight line metering module.
FIG. 1a shows an injection pump position transducer.

An injector block 10 shown in FIG. 1 of an eight-line fuel injection system has eight outlets 12. These are connected by respective ducts 14 to eight individual solenoid-operated spring biased three-port two-way shuttle valves 16 of a precision positive displacement flowmeter. Each shuttle valve 16 can pass the fluid selectively to a return line 18 for returning the fluid to a tank or reservoir, or to an input line 20 for passing the fluid to a metering unit 22 of the flowmeter. The shuttle valves 16 are spring-biased so that they normally connect the injector outlets 12 to the return line 18. On operation of their solenoids, however, the shuttle valves 16 connect the injector outlets 12 to the input line 20.

The input line 20 is connected by a duct 23 to the metering unit 22 via a contra-flow heat exchanger or intercooler 24 and an in-line filter 26. The duct 23 leads to a first pressurizing spring-loaded valve 28 which is connected to one port of a solenoid-operated two-port shuttle valve 30 and to an upper fluid receiving chamber 32 of a cylinder block 34. A further duct 36 connects the other port of the valve 30 to a lower chamber 38 of the cylinder block 34. This lower chamber 38 is also connected to a return line 40, for returning fluid to a tank or reservoir of a test stand fluid system (not shown), via a second pressurizing spring-loaded ball valve 42.

A precision-made piston or plunger 44 is free to travel vertically inside the cylinder block 34 between two ends of travel. Its movement is guided by a piston rod 46 fixed or integral with the piston or plunger 44, which rod passes through an appropriately dimensioned bore 48 through the lower end 50 of the cylinder block 34. A helical compression spring 52 is arranged in the lower chamber 38 to urge the piston or plunger upwardly into the upper chamber 32. A strong PTFE sealing ring 54 sandwiched between upper and lower portions of the cylinder block 34 has an inner periphery which presses against the piston 44 and prevents any direct fluid exchange between the upper and lower chambers 32 and 38.

Figure 4:
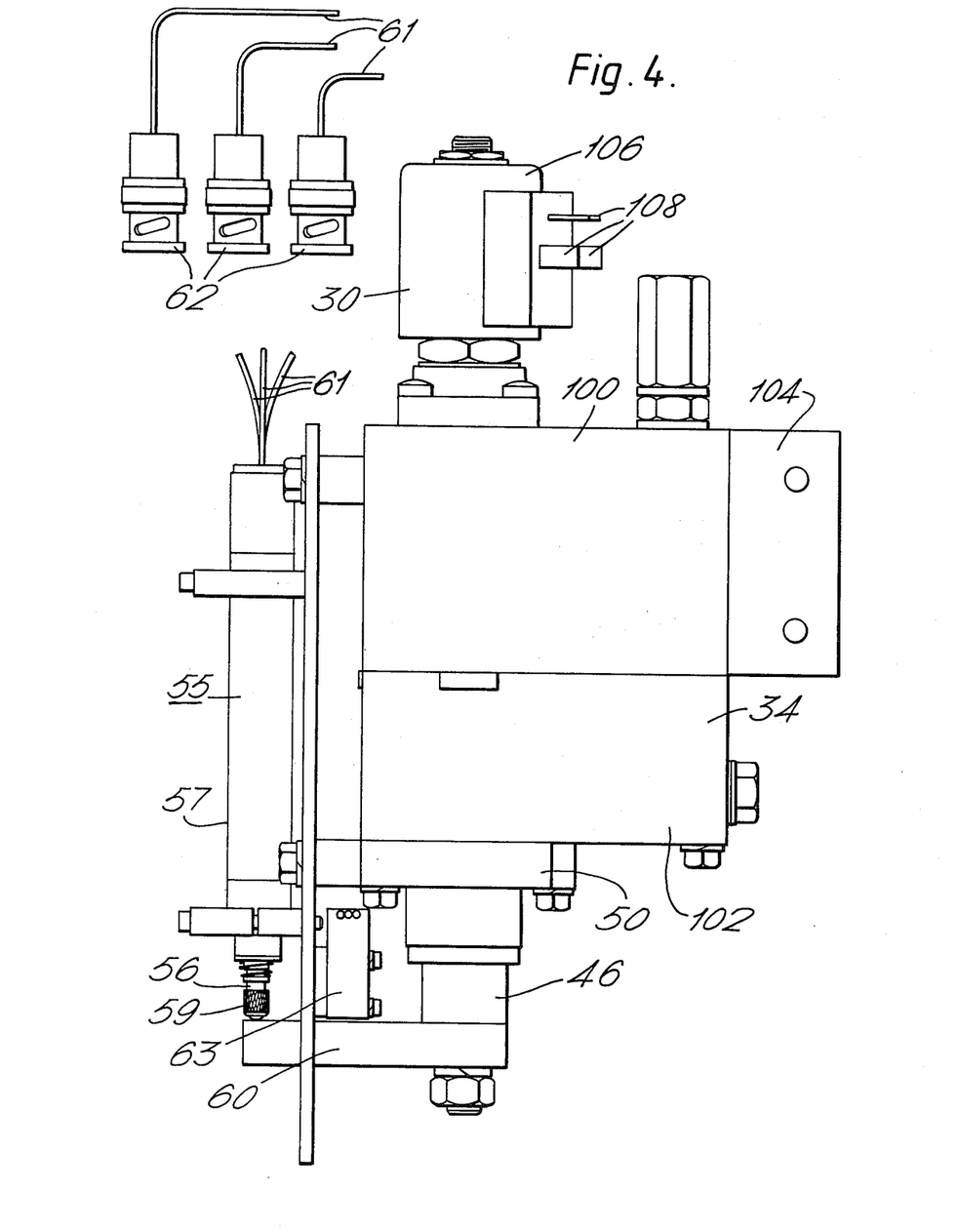
FIG. 4 is a side elevational view of the flowmeter.

Movement of the piston 44 is monitored precisely by a super linear variable capacitance transducer 55 for converting linear position into an electrical signal. It has a shaft 56 which is axially slidable in the main body 57 of the transducer, the shaft being urged in an outward direction by a helical compression spring 58 so that it tends to project further from the main body 57. A free end 59 of the shaft 56 is lightly pressed against a cantilever 60 by the spring biasing of the shaft 56, the cantilever 60 being fixed to a lower end of the piston rod 46. Thus the position of the piston 44 determines the position of the shaft 56 which in turn determines the value of a capacitance in the transducer, this value being dependent upon the degree of overlap between the shaft 56 and a metal tube (not shown) inside the transducer 55. A dielectric sleeve (not shown) extends between the tube and the shaft 56. The variable capacitance and a reference capacitance (not shown) within the main body 57 are connected to the circuitry of a dc-dc signal conditioner (not shown) by three flying leads 61 extending from the transducer 55. The leads are provided with connectors 62 (shown in FIG. 4) which connect with BNC sockets (not shown) of the signal conditioner. The circuitry of the signal conditioner gives a continuous d.c. output proportional to the displacement of the shaft 56 from a fully retracted position within the main body 57.

Electronic control circuitry, to be described in greater detail hereinafter, is connected to process signals from the transducer and a piston return microswitch 63, and also signals indicative of the state of the valve 30 and signals from a test stand drive hub (not shown). The latter is connected to a shaft which drives a fuel injection pump (not shown) which supplies the injectors, and is extended by the addition of a steel distance piece 64 shown diagrammatically in FIG. 1a. The distance piece 64 carries an external Tufnol sleeve 65. A magnetic pick-up (or proximity switch) 66 and a steel peg 67 in the Tufnol sleeve 65 are positioned so that the pick-up 66 produces a pulse between two consecutive injections.

Operation of the flowmeter when used for testing an eight-line fuel injection system is as follows:

One of the solenoid-operated valves 16 is energized so that injected fluid is routed from the line connected to that valve to the metering unit along the duct 23 via the intercooler 24 and the in-line filter 26. The valve may be the only one energized, for a "Line" mode of operation in which the difference lines are selected in turn, or it may be energized along with all the other valves for a "Totalize" mode of operation, in which the sum of the outputs of all eight lines is metered.

Injected fluid leaving the injector block 10 first enters the intercooler 24 where the temperature of the fluid is stabilized at approximately 40° C. The coolant supplied to the intercooler 24 is test oil from a test stand fuel system (not shown) which is temperature controlled to remain within the range 40°±2° C.

Injected fluid leaving the intercooler 24 then passes through the in-line filter 26 before reaching the first pressurizing valve 28. This valve 28 creates a back-pressure of 100 p.s.i., and forces back into solution any gas which came out of solution during injection.

At this stage the shuttle valve 30 is energized and open, so that injected fluid from the duct 23 is routed into the further duct 36, into the lower chamber 38 to warm the metering unit 22, and back to the tank via the second pressurizing valve 42 in the return line 40. At the start of a metering cycle the solenoid of the valve 30 is de-energized. This closes the valve 30 so that injected fluid has to flow into the upper chamber 32 of the cylinder block 34 to displace the piston 44 downwards against the action of its compression spring 52. As a result, the output signal from the transducer 46 changes in dependence upon the position of the piston 44. The control circuitry now counts pick-up pulses from the pick-up 66 to perform a pre-count of 10 pump drive shaft turns. On the tenth pick-up pulse, a transducer reading is taken. This reading is taken between two injections, at an instant when the piston 44 is stationary, for improved accuracy. Nonetheless, fluid has already begun to flow into the chamber 32, so that measurement commences on a flying start. The circuitry continues to count the pick-up pulses until a pre-selected number of shaft turns have occurred since the first reading. A second transducer reading is taken on the instant of completion of this pre-selected number of turns, between injections, but before the valve 30 is energized, so that measurement is terminated with a flying finish. After the second reading has been taken the solenoid valve 30 is energized, allowing the metering piston 44 to return to the start position under the action of the helical compressor spring 52. Fluid in the upper chamber 32 can flow out into the further duct 36 under the driving force of the compression spring 52. This fluid passes back to the tank via the lower chamber 38. Thus the piston 44 returns to its start position, whereupon it triggers the micro-switch 63 to initiate a further metering cycle.

The first transducer reading is subtracted from the second which produces a value of piston displacement for the pre-selected number of injector shaft turns. This value is scaled and displayed on a digital panel meter shown in FIG. 3 and is up-dated at the end of every cycle. A pilot light is switched on every time the digital display is up-dated.

Because the transducer readings are taken after the solenoid is de-energized so that injected fluid has already begun to move the piston 44 downwardly to give a flying-start and flying-finish measuring technique, "end effects" are eliminated. This produces a fundamentally very accurate measurement of fluid flow and/or reduces the number of injector strokes required to obtain an accurate measurement.

During the metering cycle, the second pressurizing valve 42 maintains a back-pressure of 20 p.s.i. on the underside of the piston 44. The pressure above the piston during metering is therefore that required to balance the pressure under the piston 44 plus the pressure required to compress the compression spring 52. The actual value of this pressure varies between 40 and 50 p.s.i. depending on the degree of compression of the spring 52 (40 p.s.i. at zero travel of the piston 44; 50 p.s.i. at 25 mm travel).

Although the back pressure generated by the second pressurizing valve is 20 p.s.i. in the foregoing description, it is in fact variable from between 0 and 60 p.s.i. to suit different fluids being metered. It will be appreciated, however, that its back pressure must not exceed the pressure differential that would unseat the shuttle of valve 30, but at the same time it must be sufficient to prevent any gas from coming out of solution downstream of the first pressurizing valve 28.

Figure 2:
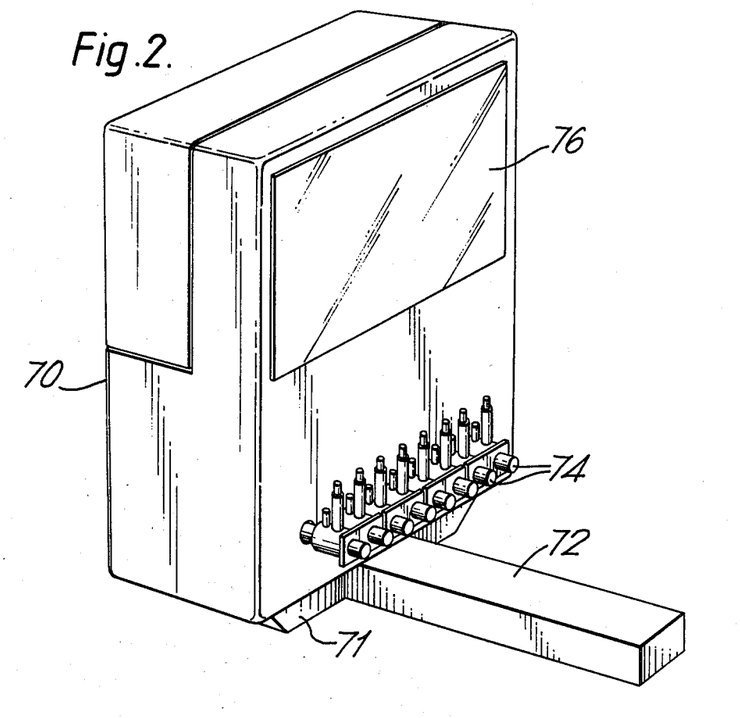
FIG. 2 is a perspective view of a module incorporating the flowmeter with some parts removed to reveal other structural details.
Figure 3:
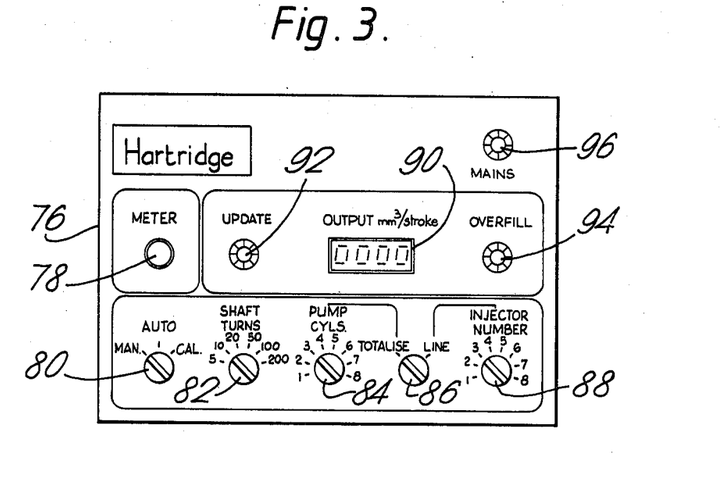
FIG. 3 is a front view of a control panel of the module.

One piece of apparatus in which the flowmeter shown in FIG. 1 can be incorporated is the metering module 70 shown in FIGS. 2 and 3. The module 70 has a base portion 71 formed with a recess to allow the module to sit securely on a beam 72. Eight inlets 74 (only two of which are shown fully) are provided on the module, one for each line of an eight-line fuel injection system. A control and display panel 76 is positioned on the upper half of the module.

The control and display panel 76 has a meter pushbutton 78 depression of which initiates a metering cycle. Five switches are arranged in a line along the bottom of the panel. The first rotary switch 80 is for selection of the metering mode of the module; manual, automatic, or calibration. The second 82, is for selecting the number of shaft turns, 5,10,20,50,100 or 200, which the control circuitry is programmed to count between taking the first and second readings on any one metering cycle.

The third rotary switch 84 is set according to the number of lines on the fuel injection system undergoing test, so that computations made by the control circuitry are made correctly. The fourth rotary switch 86 determines whether the module is operated according to the "line" mode or the "totalize" mode. The last rotary switch 88 determines which injector line is selected for metering when the rotary switch 86 is set for the "line" mode of operation.

The panel 76 also has a digital display unit 90 for showing injector line output in cubic millimeters of fluid per stroke. An update indicator light 92 is illuminated when the display on the unit 90 is updated, and an overfill light 94 comes on to give a warning when the piston 44 is approaching the bottom extreme of its available travel in the cylinder block 34. With the illustrated flowmeter, this occurs after approximately 25 cubic centimeters of fluid have been received by the upper chamber 32. If this light comes on, any result displayed on the display unit 90 is invalidated. A mains light 96 shows whether electrical power is being supplied to the module.

FIGS. 4 to 7 show the precise construction of the metering unit 22 of FIG. 1. The same reference numerals have been used in those Figures where the parts concerned correspond with those shown in FIG. 1.

The cylinder block 34 comprises upper and lower parts 100 and 102 and an adaptor part 104. Various holes are bored through these parts to accommodate the various components of the metering unit, as will be evident from the ensuing description. The solenoid operated valve 30 is bolted onto the upper face of the upper part 100. It has a solenoid coil 106 with connecting terminals 108. A lower portion of the piston rod 46 can be seen projecting from the lower end 50 of the cylinder block 34 in FIG. 4.

Figures 5, 5A:
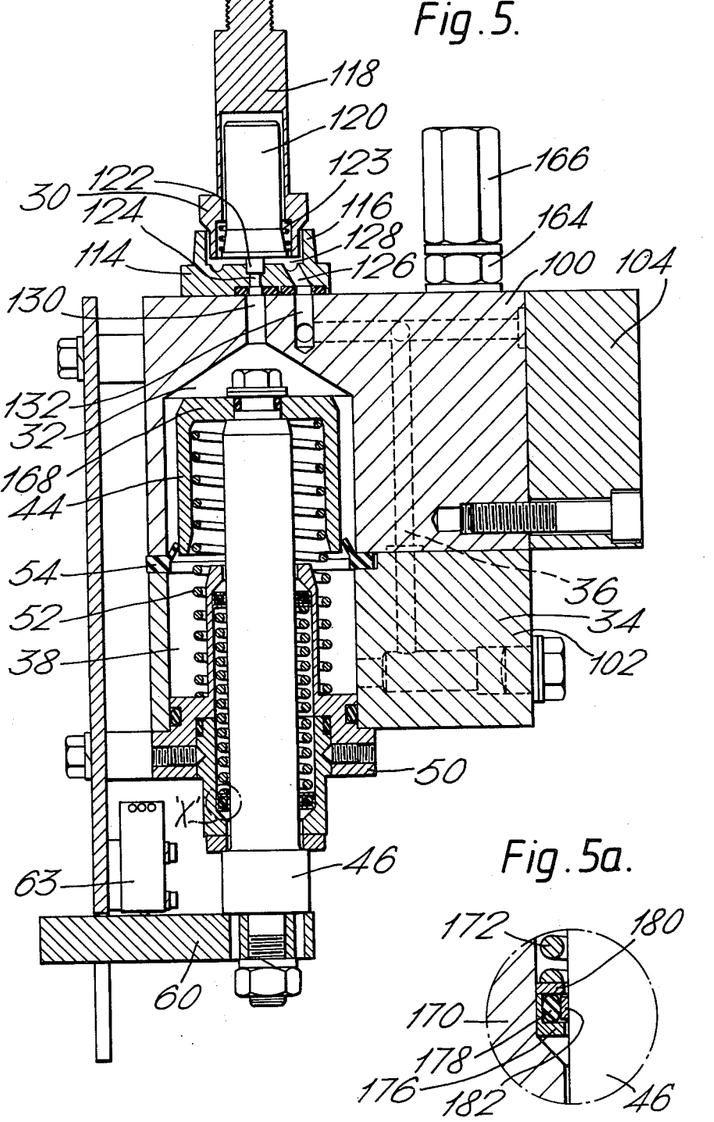
FIG. 5 is an axial sectional view of the flowmeter.
FIG. 5a is a fragmentary view of parts of the flowmeter as shown in FIG. 5 drawn on a larger scale.

Many constructional details are clearly shown in FIG. 5. The valve 30, from which the solenoid coil has been removed in FIG. 5 to show other parts more clearly, has a base portion 114 having an internally screw-threaded flange 116 into which is screwed an externally screw-threaded end of a valve sleeve 118. A shuttle 120 is slidably held inside the sleeve 118. The shuttle 120 has an end face which normally contacts a cylindrical seat 122 on the base portion 114 by virtue of a biasing spring 123 urging the shuttle 120 in a downward direction. The seat 122 is at one end of a first bore 124 in the base portion 114. Another bore 126 extends through the base 114. Both bores open into a cavity 128 between the sleeve 118 and the base 114, although the bore 124 is normally shut off by the shuttle 120. When the solenoid (not shown in FIG. 5) is energised, the shuttle 120 is raised against the action of the biasing spring by the magnetic force created by the electrical current through the solenoid. This lifts the end face of the shuttle 120 off the seat 122, bringing the bores 124 and 126 into communication with one another via the cavity 128. The valve 30 is positioned on the block 34 so that the bores 124 and 126 in the base 114 of the valve 30 are in register with respective bores 130 and 132 in the upper part 100 of the valve block 34. O-rings 134 seal the joins between the bores in the block and those in the valve.

When the valve 30 is energised, its shuttle 120 is raised to open the valve and fluid entering the upper chamber 32 through a bore 136 (shown in FIG. 7) takes an outlet route via the bores 130, 124, 126 and 132 in preference to filling the chamber 32 against the force of the compression spring 52. The bore 136 extends from the pressurizing valve 28 which receives fluid from an inlet port 138 in the adaptor block 104. The pressurizing valve 28 comprises a helical spring 140 which presses a slidable member 142 against an annular seat 144 of the valve. The force required to lift the slidable member 142 off its seat 144 to open the valve is equivalent to a fluid pressure of 100 p.s.i.

Fluid leaving the upper chamber 32 through the bores 130, 124, 126 and 132 continues through the duct 36 into the lower chamber 38 which the fluid leaves via a duct 146 (shown in FIG. 6) to the adjustable pressurizing valve 42 and thence to an outlet 148 in the adaptor block 104. The outlet 148 is connected to the return line 40 shown in FIG. 1.

Figure 6:
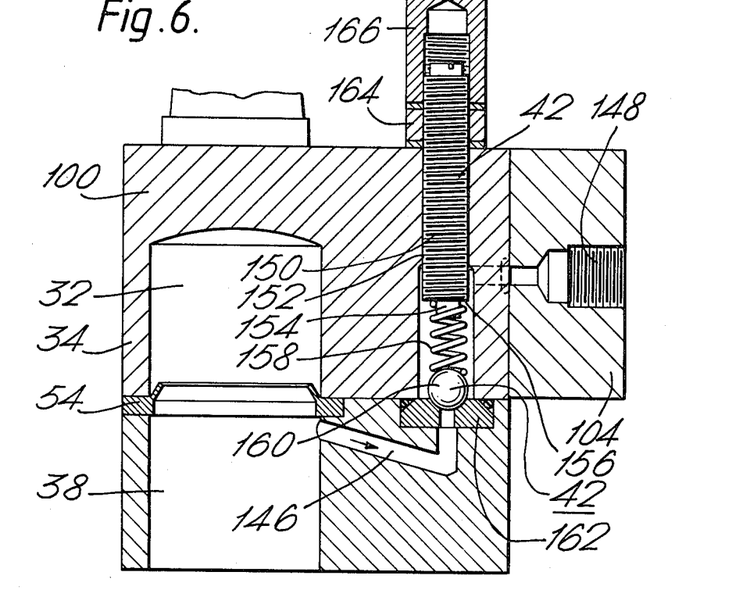
FIGS. 6 and 7 are sectional views of the flowmeter in two vertical mutually parallel planes.
Figure 7:
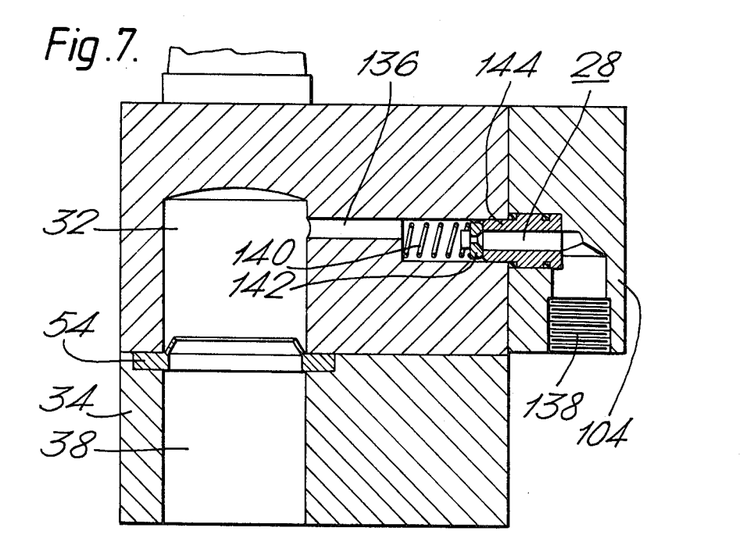

As shown clearly in FIG. 6, the pressurizing valve 42 comprises a screw-threaded rod 150 engaging a vertically-extending internally threaded bore 152 in the upper part 100 of the block 34. A lower end 154 of the rod 150 is narrowed to provide a seat 156 for one end of a helical compression spring 158, the other end of which contacts a ball 160 to urge the latter against a seat 162. The force with which the ball is pressed against the seat by the spring 158 can be adjusted by screwing the rod 150 further into the block 34 or further out from the block to vary the force required to lift the ball 160 from its seat 162 between values equivalent to fluid pressures from 0 to 60 p.s.i. Once the back pressure has been set in accordance with the test fluid to be used, the rod 150 is held in position by locking nuts 164 and 166.

From FIG. 5 it is also evident that the piston 44 is hollow and open at its lower end, the compression spring 52 extending into the piston's interior with its upper end pressing against the interior face of an end wall 168 of the piston 44.

An efficient seal between the piston rod 46 and the cylinder block 34 is provided by a compound sleeve 170 through which the rod 46 extends, a helical compression spring 172 extending axially within the sleeve 170 around the rod 46. The spring urges respective O-ring assemblies 174 towards the opposite ends of the sleeve 170 the ends of the interior of which taper so that the O-ring assemblies are wedged between the rod 46 and the sleeve 170 to effect a good seal. The O-ring assemblies 174, as shown particularly in FIG. 5a, each comprise an L-sectioned seal retainer ring 176, an O-ring 178 seated in the retainer ring, a retainer cover ring 180 between the O-ring 178 and the spring 172, and a carbon sealing ring 182 between the O-ring 178 and the rod 46.

Figure 8:
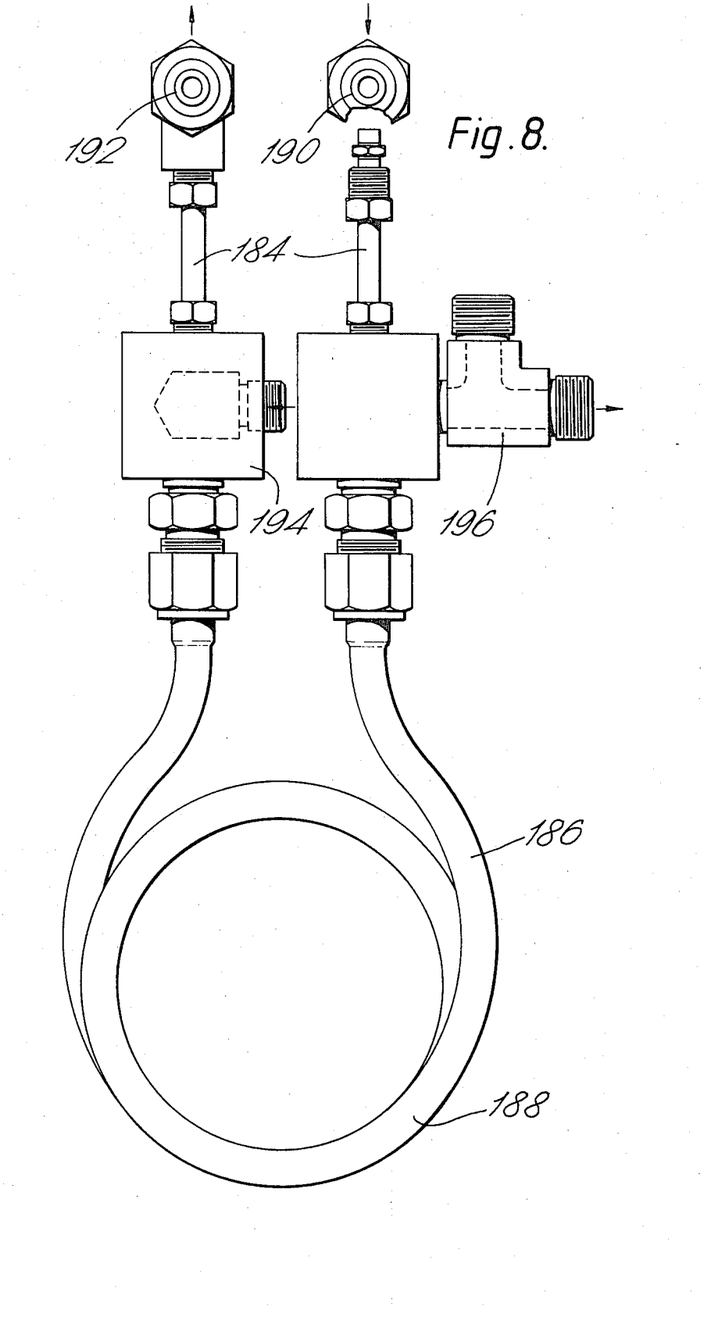
FIG. 8 is a front elevational view of an intercooler for use with the flowmeter.
Figure 8A:
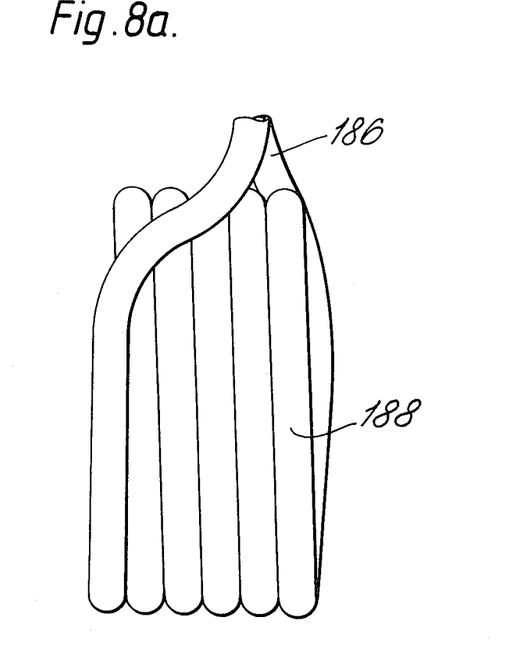
FIG. 8a is a side view of a helical part of the intercooler shown in FIG. 8.

Details of the intercooler 24 are shown in FIGS. 8 and 8a. It comprises a copper tube 184 extending coaxially within a nylon tube 186, the compound tube being coiled into a helix 188 so that the compound tube is long but compact. An inlet 190 at one end of the copper tube 184 receives test fluid which passes out of the intercooler at the other end of the copper tube 192. Coolant from a tank or reservoir maintained at substantially 40° C. enters the intercooler at an inlet 194, adjacent to the outlet of the copper tube, into the space between the copper and nylon tubes. The coolant leaves through an outlet 196 at the other end of the compound tube. Thus the test fluid and coolant flow in opposite directions so that, by the time the test fluid has reached its outlet 192, the temperatures of the test fluid and coolant are very nearly the same. The intercooler enables measurements to be made which are substantially unaffected by ambient temperatures.

Figure 9:
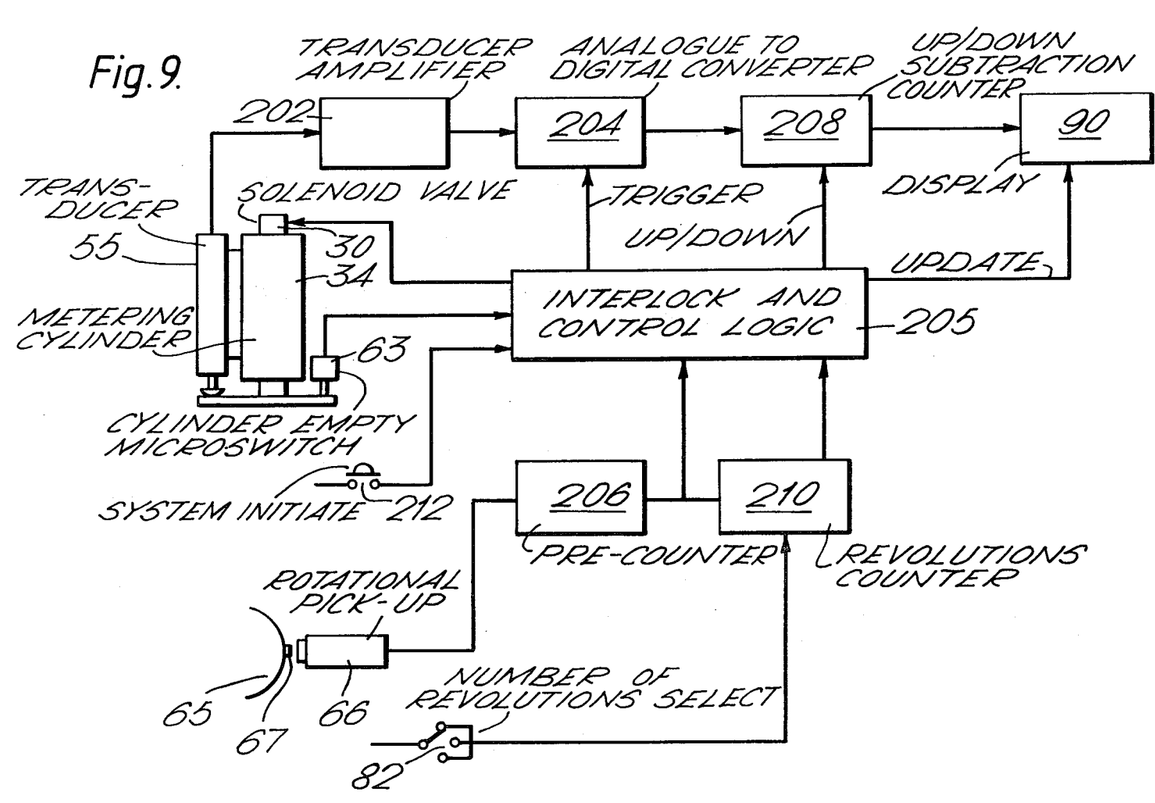
FIG. 9 is a block circuit diagram of circuitry for use with the flowmeter shown in FIGS. 4 to 7.

The control and display circuitry of the flowmeter is shown in FIG. 9. The transducer 55 is connected to an amplifier 202 which produces an analogue output whose amplitude accurately represents the piston displacement. The signal from the transducers' amplifier 202 is fed to an analogue to digital converter 204 which has a sample time of the order of a few tens of microseconds.

When a signal is issued from the microswitch 63, which occurs when the piston deflection is zero, the cylinder solenoid valve 30 is operated by interlock and control logic circuitry 205 so that fuel is directed into the upper chamber 32 shown in FIG. 1 for example. At the same time a pre-counter 206 is activated which counts a pre-determined number of signals from the rotation magnetic pick-up 60. At the end of this count the analogue to digital converter 204 is triggered by the interlock and control logic circuitry 205 and the pre-counter 206 to take eight readings within a period of approximately 1 millisecond. The measurement is thus commenced with a flying start. These eight readings are electronically averaged and the value counted down in an "up-down" subtraction counter 208, the count being down in accordance with a command signal from the interlock and control logic circuitry.

At the end of the pre-count a main revolutions counter 210 is enabled which counts a pre-determined number of signals from the rotational magnetic pick-up 66. At the end of this count the analogue to digital converter 204 is again triggered to take eight readings which are electronically averaged. The measurement is thus terminated with a flying finish. This time the resultant value is counted up in the "up-down" counter 208. The resultant "up-down" counter value represents the difference between the first reading value and the second reading value and hence the value of the piston displacement for the number of injections encompassed by the main count.

At the end of the main count a further small count of rotational magnetic pick-up signals is taken at the end of which the value in the "up-down" counter 208 is transferred to the digital display 90 and the cylinder block solenoid valve 30 is altered so that fuel by-passes the upper chamber of the cylinder block which is therefore emptied under the influence of the internal compression return spring 52. When the piston 44 (shown in FIG. 1 for example) is at its zero deflection position, the microswitch 63 is again operated and the sequence is repeated.

The values from the analogue to digital converter 204 are transferred to the "up-down" counter 208 using a series of internally generated clock pulses. The ratio of clock pulses to the number stored in the analogue to digital converter 208 is variable in a predetermined manner and this provides the necessary scaling to take account of the number of lines of the system under test and the number of revolutions measured in the main count between readings, and enables the digital display to be in the engineering units required (cu.mm/stroke/-line).

In one particular form of the circuitry a series of main counts and a series of numbers of lines are electrically stored in an EPROM and can be selected by operation of an external switch, thus allowing easy alteration of test conditions.

A system initiate switch 212 is also provided which allows the measuring sequence to be activated at will.

Important features of the foregoing electronic measurement, particularly in using a micro processor, are as follows:

(a) fast reading of signal values (tens of microseconds)

(b) averaging of several fast readings (8 during 1 millisecond) in order to minimise noise effects.

(c) a predetermined "pre-count" before the first reading.

(d) inherent scaling for different counts and numbers of lines to ensure correct engineering units in the readout.

(e) storage of the main count in an EPROM or similar so as to enable easy selection from an external select switch of any particular count.

We claim:

1. A flowmeter comprising a chamber-defining part and a displaceable member which is moveable in relation to said chamber-defining part between two ends of travel to change the size of the chamber, means defining an inlet fluid-flow path which leads to said chamber and an outlet fluid-flow path of the flowmeter, flow-control means arranged in said fluid-flow path defining means to control the flow of fluid selectively through the said inlet fluid-flow path to move said displaceable member or from said inlet fluid-flow path to said outlet fluid-flow path without moving said displaceable member, measuring means arranged to measure the distance through which said displaceable member moves, flying start means connected to the measuring means to cause the latter to commence measurement at a time after said flow-control means have been switched to cause fluid to flow through said inlet fluid-flow path to move said displaceable member away from one of said ends of travel, terminating means arranged to cause the measurement to be terminated before said displaceable member reaches its other end of travel, whereby the measurement is completed during a single stroke of said displaceable member, and return means arranged to return said displaceable member to its starting end of travel before each succeeding measurement by said measuring means, whereby all measurements are made with said displaceable member travelling in the same direction.

2. A flowmeter according to claim 1, in which the terminating means is connected to the measuring means to cause the latter to terminate measurement at a time before said flow-control means are switched to cause fluid to flow from said inlet fluid-flow path to said outlet fluid-flow path, so that the measurement is terminated by a flying finish.

3. A flowmeter according to claim 1, in which the flying start means comprise detector means constructed to detect successive revolutions of the shaft of a pump which pumps fluid to the flow-meter when the latter is in use, and to cause said measuring means to commence measurement at the beginning of a pump shaft revolution.

4. A flowmeter according to claim 3, in which said flying start means cause said measuring means to commence measurement after a predetermined number of shaft revolutions have occurred from the time when said flow-control means were switched to cause fluid to move said displaceable member.

5. A flowmeter according to claim 1, in which said return means comprises a helical compression spring.

6. A flowmeter according to claim 1, in which said outlet fluid-flow path includes a further chamber which is partly bounded by said displaceable member on the side thereof opposite to the first-mentioned chamber.

7. A flowmeter comprising a chamber-defining part and a displaceable member which is moveable in relation to said chamber-defining part between two ends of travel to change the size of the chamber, means defining an inlet fluid-flow path which leads to said chamber and an outlet fluid-flow path of the flowmeter, flow-control means arranged in said fluid-flow path defining means to control the flow of fluid selectively through the said inlet fluid-flow path to move said displaceable member or from said inlet fluid-flow path to said outlet fluid-flow path without moving said displaceable member, measuring means arranged to measure the distance through which said displaceable member moves, flying start means connected to the measuring means to cause the latter to commence measurement at a time after said flow-means have been switched to cause fluid to flow through said inlet fluid-flow path to move said displaceable member away from one of said ends of travel, and a pressurizing valve arranged in said inlet fluid-flow path which leads to said chamber and constructed to ensure that there is a sufficient pressure differential across it to force any gas which forms in the fluid upstream of the valve when the flowmeter is in use, back into solution.

8. A flowmeter comprising a chamber-defining part and a displaceable member which is moveable in relation to said chamber-defining part between two ends of travel to change the size of the chamber, means defining an inlet fluid-flow path which leads to said chamber and an outlet fluid-flow path of the flowmeter, flow-control means arranged in said fluid-flow path defining means to control the flow of fluid selectively through the said inlet fluid-flow path to move said displaceable member or from said inlet fluid-flow path to said outlet fluid-flow path without moving said displaceable member, measuring means arranged to measure the distance through which said displaceable member moves, flying start means connected to the measuring means to cause the latter to commence measurement at a time after said flow-control means have been switched to cause fluid to flow through said inlet fluid-flow path to move said displaceable member away from one of said ends of travel, and temperature control means arranged upstream of said chamber to maintain the temperature of the fluid within a predetermined range.

9. A flowmeter according to claim 8, in which said temperature control means comprises an intercooler with means defining adjacent passageways through one of which flows fluid substantially at a predetermined temperature and through one of which flows fluid which is being metered when the flowmeter is in use, to allow heat exchange between the fluids.

10. A flowmeter comprising a chamber-defining part and a displaceable member which is moveable in relation to said chamber-defining part between two ends of travel to change the size of the chamber, means defining an inlet fluid-flow path which leads to said chamber and an outlet fluid-flow path of the flowmeter, flow-biasing means arranged to allow fluid to flow from said inlet fluid-flow path to said outlet fluid-flow path without moving said displaceable member more easily than through said inlet fluid-flow path to move said displaceable member, an open-and-shut valve arranged in said outlet fluid-flow path to direct the flow of fluid selectively through said inlet fluid-flow path to move said displaceable member or through said outlet fluid-flow path, measuring means arranged to measure the distance through which said displaceable member moves, and flying start means connected to the measuring means to cause the latter to commence measurement at a time after said flow-control means have been switched to cause fluid to flow through said inlet fluid-flow path to move said displaceable member away from one of said ends of travel.

* * * * *